US007895972B2

(12) United States Patent
Gudmundsson et al.

(10) Patent No.: US 7,895,972 B2
(45) Date of Patent: Mar. 1, 2011

(54) ARRANGEMENT AND METHOD FOR VISUAL DETECTION IN A MILKING SYSTEM

(75) Inventors: Mats Gudmundsson, Södertälje (SE); Rafaels Amolin, Stockholm (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 11/992,399

(22) PCT Filed: Oct. 18, 2006

(86) PCT No.: PCT/SE2006/001183

§ 371 (c)(1),
(2), (4) Date: Jun. 5, 2008

(87) PCT Pub. No.: WO2007/050012

PCT Pub. Date: May 3, 2007

(65) Prior Publication Data
US 2008/0257268 A1 Oct. 23, 2008

(30) Foreign Application Priority Data

Oct. 24, 2005 (SE) .................................. 0502350

(51) Int. Cl.
*A01J 5/00* (2006.01)
(52) U.S. Cl. .................................................... 119/14.1
(58) Field of Classification Search ................ 119/14.1, 119/14.02, 14.08, 14.14, 14.18
See application file for complete search history.

(56) References Cited

U.S. PATENT DOCUMENTS

| 3,605,695 | A | * | 9/1971 | Thomas et al. ............. 119/14.1 |
| 4,685,422 | A | * | 8/1987 | Middel et al. ............. 119/14.13 |
| 4,838,207 | A | * | 6/1989 | Bom et al. ................. 119/14.02 |
| 4,867,103 | A | | 9/1989 | Montalescot et al. |
| 5,042,428 | A | * | 8/1991 | Van der Lely et al. .... 119/14.08 |
| 5,379,722 | A | * | 1/1995 | Larson ....................... 119/14.1 |

(Continued)

FOREIGN PATENT DOCUMENTS

DE 4113700 10/1992

(Continued)

OTHER PUBLICATIONS

European 3rd-Party Observations dated Oct. 6, 2009 for corresponding European Patent Application No. 06799782.5.

*Primary Examiner*—Rob Swiatek
*Assistant Examiner*—Ebony Evans
(74) *Attorney, Agent, or Firm*—Finnegan, Henderson, Farabow, Garrett & Dunner, LLP

(57) ABSTRACT

A visual detection arrangement is provided in a milking system (3) comprising a robot arm (15) for attaching a teat cup (11) to a teat of a milking animal (8), and a control device (19) for controlling the movement of the robot arm. The detection arrangement comprises first visual detection means (17) provided on the robot arm for repeatedly determining the teat position relative the robot arm and second visual detection means (21) directed towards the milking animal. The second visual detection means (21) is provided for detecting a position of the animal in a longitudinal direction (x), and the control device (19) is initially provided for controlling the movement of the robot arm based on information of the position of the teat of the animal relative the animal itself, and on the detected longitudinal position of the animal.

20 Claims, 2 Drawing Sheets

U.S. PATENT DOCUMENTS

| | | | |
|---|---|---|---|
| 5,865,138 A * | 2/1999 | van der Lely | 119/14.02 |
| 5,934,220 A * | 8/1999 | Hall et al. | 119/14.08 |
| 5,979,359 A * | 11/1999 | Hansson | 119/14.08 |
| 6,055,930 A | 5/2000 | Stein et al. | |
| 6,167,839 B1 * | 1/2001 | Isaksson et al. | 119/14.08 |
| 6,269,767 B1 * | 8/2001 | Hoppe et al. | 119/14.47 |
| 6,363,883 B1 * | 4/2002 | Birk | 119/14.08 |
| 6,431,116 B1 * | 8/2002 | Nilsson | 119/14.08 |
| 6,532,892 B1 | 3/2003 | Nilsson | |
| 6,860,226 B2 * | 3/2005 | Nilsson | 119/14.02 |
| 6,974,373 B2 * | 12/2005 | Kriesel | 452/157 |
| 7,073,458 B2 * | 7/2006 | Sjolund et al. | 119/14.02 |

FOREIGN PATENT DOCUMENTS

| | | |
|---|---|---|
| DE | 196 36 551 | 3/1998 |
| EP | 188303 | 7/1986 |
| EP | 213660 | 3/1987 |
| WO | WO 97/15901 | 5/1997 |
| WO | WO 99/30277 | 6/1999 |
| WO | WO 99/33021 | 7/1999 |
| WO | WO 00/11940 | 3/2000 |

* cited by examiner

ARRANGEMENT AND METHOD FOR VISUAL DETECTION IN A MILKING SYSTEM

TECHNICAL FIELD OF THE INVENTION

The present invention generally relates to dairy farm robot milking and to visual detection related thereto.

DESCRIPTION OF RELATED ART AND BACKGROUND OF THE INVENTION

In a known milking system, wherein teat cups are automatically attached to the teats of a milking animal to be milked, a robot arm with a gripper is provided to grip and hold teat cups during the attachment of the teat cups. A laser emitting laser light and a video camera provided to register laser light as reflected from the teats of the milking animal are mounted on the robot arm. By aid of a method known as laser triangulation, the positions of the teats can be calculated. The movement of the robot arm can then be controlled in response to the calculated positions to be capable of finding the teats for the teat cup attachments.

In order to operate satisfactorily, the robot arm needs to be close to the teats. Since each milking animal has a different constitution (the udders of the milking animals may be located at quite different locations) it may be difficult for the above arrangement to find the teats of a milking animal which has not been milked before, and for which consequently no teat position data is available. The milking system is thus typically teached approximately where to find the teats of the milking animal manually by the farmer. Further, the position of the milking animal in a longitudinal direction with respect to the milking animal is measured by a sensor, which senses the position of a rear plate as displaced by the back of the milking animal while standing in a milking box. The following times the same milking animal is identified in the milking box, the milking system refers to the actual position of the rear plate as measured, and to the knowledge of the milking animal's constitution, i.e. the relative location of its teats, in order to determine an approximate position of the teats of the milking animal.

Further, several approaches for automatically teaching the milking system where to approximately find the teats of the milking animal are known in the art.

U.S. Pat. No. 6,532,892 B1 discloses a method for finding the teats of a milking animal based on sequential movements of a scanning head in various directions.

U.S. Pat. No. 4,867,103 discloses a milking system comprising four robot arms, each being provided with a teat cup and detector means. A camera arrangement is fixedly arranged outside of the milking stall. Approximate positioning of the teat cups are made by controlling the four arms from information supplied by the camera arrangement. This is continued until the teats reach the field of action of the detector means associated with the different milking cups and designed to allow the final positioning thereof, the arms being then moved in response to the signals received from the detector means.

SUMMARY OF THE INVENTION

A problem with the milking system, wherein a sensor senses the position of a rear plate as displaced by the back of a milking animal while standing in a milking box, is that the sensor is exposed to dirt and possibly physical contact with the milking animal, and as a consequence the sensor may not work reliably or may even be damaged. Further, the sensor has to be provided for the single purpose of measuring the longitudinal position of the milking animal, and the costs for the sensor may not be negligible.

A problem with the approaches for automatically teaching the milking system where to approximately find the teats of the milking animal is that they may not work satisfactorily, i.e. the number of correct teat cup attachments may be low.

A problem with the approach described in U.S. Pat. No. 4,867,103 is that the milking process may be prolonged if the approximate position of the teats has to be determined for each milking.

It is thus an object of the present invention to provide an arrangement and a method for visual detection in a milking system, which solve at least some of the problems of the prior art as set forward above.

It is in this respect a particular object of the invention to provide such an arrangement and such a method, which is capable of fastly moving the robot arm to an approximate position of the teats of the milking animal when being in the milking box.

It is a further object of the invention to provide such an arrangement and such a method, which are efficient and which can be used for several purposes.

It is yet a further object of the invention to provide such an arrangement and such a method, which are robust, effective, fast, precise, accurate, reliable, safe, easy to use, and of low cost.

It is still a further object of the invention to provide such an arrangement and such a method, which are capable of obtaining a very high number of correct teat cup attachments.

These objects among others are, according to the present invention, attained by arrangements and methods as claimed in the appended patent claims.

According to a first aspect of the invention there is provided an arrangement for visual detection in a milking system comprising a robot arm for automatically attaching a teat cup to a teat of a milking animal when being located in a milking box, and a control device for controlling the movement of the robot arm based on a repeatedly determined position of the teat of the milking animal relative the robot arm. The arrangement comprises a first visual detection device provided on the robot arm for repeatedly determining the position of the teat of the milking animal relative the robot arm and a second visual detection device directed towards the milking animal when being located in the milking box.

The control device comprises means for holding or receiving information of the position of the teat of the milking animal relative the milking animal itself, i.e. the location of the udder/teats of the milking animal with reference to a fixed point such as the very back of the milking animal. This information is typically measured or retrieved—manually or automatically—at least the very first time the milking animal is to be milked in the milking system.

The second visual detection device is provided for detecting a position of the milking animal in a longitudinal direction when being located in the milking box, and the control device is, in an initial phase of the application of the teat cup to the teat of the milking animal, provided for controlling the movement of the robot arm based on the information of the position of the teat of the milking animal relative the milking animal itself, and on the detected position of the milking animal in the longitudinal direction. Hereby, the approximate position of the teat is fastly achieved, and the robot arm can move directly to such position. Then, the control device controls the fine movement of the robot arm based on the repeatedly determined position of the teat of the milking animal relative the robot arm as measured by the first visual detection device mounted on the robot arm.

The second visual detection device is preferably a two-dimensional camera which covers a larger detection area than the first visual detection device, and has a lower, or much lower, detection frequency than the first visual detection device. For instance, a repetition rate of one image per second would be sufficient for the above purpose. This gives good possibilities for obtaining a cheap and flexible implementation.

In one embodiment of the invention the second visual detection device comprises a network camera and a server provided with image processing software and connected to the control device of the milking system via a standard wired or wireless connection and provided to communicate with the control device via a standard network protocol.

Further, the above solution with a fixed low repetition rate overview camera makes it possible to take care of a number of various detection and monitoring activities that are performed using separate sensors and devices, and/or which are not performed at all, in prior art milking systems.

The second visual detection device may thus be provided for detecting any of the following: (i) whether there exists a milking animal in the milking box or not; (ii) whether there exists an obstacle in the working area of the robot arm or not; (iii) the activity of the milking animal when being located in the milking box; (iv) an incorrect teat cup attachment; and (v) a teat cup kick-off.

If the second visual detection device is provided for detecting whether there exists an obstacle in the working area of the robot arm or not, it may be equipped with an alarm device for alarming a user of the milking system, or with a control device for halting the movement of the robot arm of the milking system, in case that there exists an obstacle in the working area of the robot arm.

Further, the second visual detection device may be provided for recording visual detections of the milking animal in connection with an earlier milking of the milking animal sufficient for deducing the information of the position of the teat of the milking animal relative the milking animal itself. In this manner a method for automatically teaching the milking system where to approximately find the teats of the milking animal is provided, however this method being quite different from those known in the art.

Image processing software is thus used for deducing information of the position of the teat of the milking animal relative the milking animal itself, i.e. the location of the udder/teats of the milking animal with reference to a fixed point such as the very back of the milking animal, quite rarely, but at least prior to the very first time a milking animal is milked by the milking system. At the following milkings the above quite complicated processing is not needed, but only a position of the milking animal in the longitudinal direction is needed (together with the above deduced and subsequently stored information) in order to approximately locate the teat of the milking animal. Such position may be determined in the image processing by employing e.g. an edge-detection method.

According to a second aspect of the invention there is provided a method for visual detection in the above described milking system, wherein the method comprises the steps of: (i) retrieving information of the position of a teat of a milking animal relative the milking animal itself, (ii) directing a first visual detection device towards the milking animal when being located in the milking box, (iii) detecting a position of the milking animal in a longitudinal direction when being located in the milking box by means of the first visual detection device, (iv) initially controlling the movement of the robot arm based on the information of the position of the teat of the milking animal relative the milking animal itself, and on the detected position of the milking animal in the longitudinal direction, to thereby reach an approximate position of the teat of the milking animal, (v) and thereafter repeatedly determining the position of the teat of the milking animal relative the robot arm by means of a second visual detection device provided on the robot arm, and controlling the movement of the robot arm based on a repeatedly determined position of the teat of the milking animal relative the robot arm to thereby reach an exact position of the teat of the milking animal.

Further characteristics of the invention and advantages thereof, will be evident from the following detailed description of preferred embodiments of the present invention given hereinafter and the accompanying FIGS. 1-3, which are given by way of illustration only and are thus not limitative of the present invention.

DETAILED DESCRIPTION OF EMBODIMENTS

Figure 1:
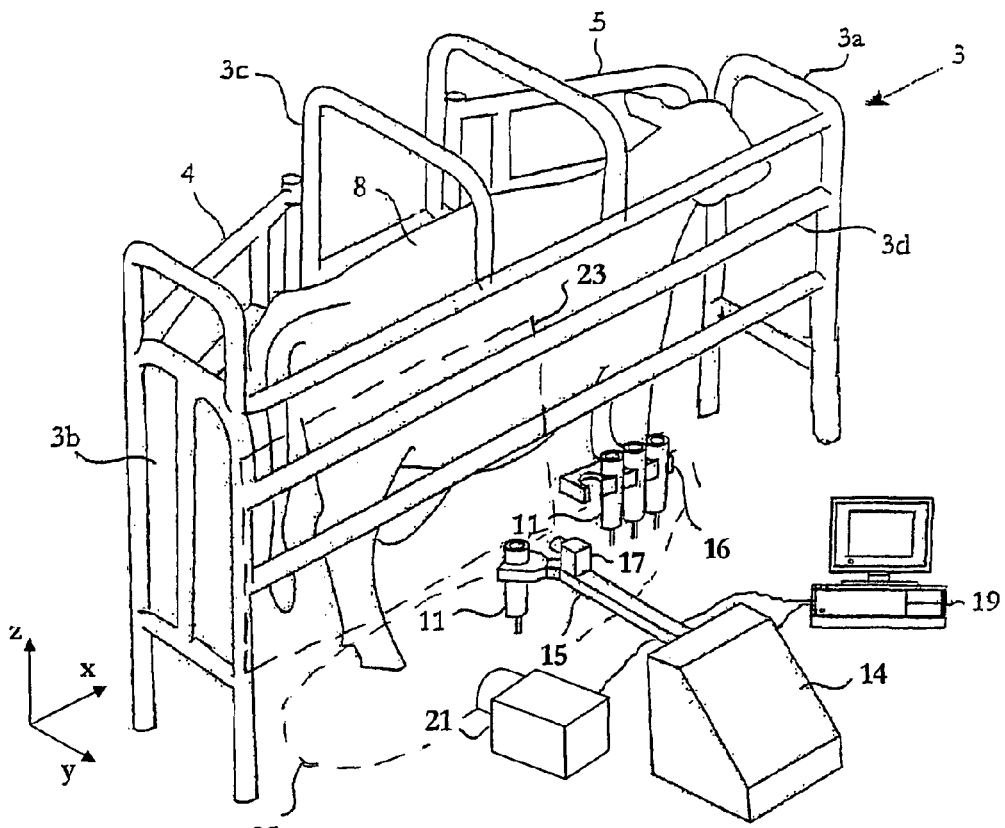
FIG. 1 displays schematically in a perspective view an automated milking system including an arrangement for visual detection according to an embodiment of the present invention.

In FIG. 1 is shown a milking system or station 3 arranged for voluntary milking of freely walking animals such as cows, i.e. the cows enter the milking system 3 in order to be milked on a voluntary basis. The milking system 3 comprises a milking box having an inlet gate 4 and an outlet gate 5, which are both capable of being opened automatically. The front end of the milking box of the milking system 3 is denoted by 3a, the back end is denoted by 3b, the left side is denoted by 3c and the right side is denoted by 3d.

The milking system 3 comprises further an automatic milking machine (not explicitly illustrated) including teat cups 11 connected to an end unit by means of milk lines (only the portions attached to the teat cups 11 are shown in FIG. 1). The milking system further comprises a milking robot or automatic handling device 14 including a processing and control device 19 and a robot arm 15 provided with a gripper. The milking robot 14 is arranged to automatically apply the teat cups 11 of the milking machine to the teats of a cow 8 present in the milking box prior to milking. In FIG. 1 three of the teat cups 11 are arranged in a teat cup rack or magazine 16, whereas the fourth one is held by the gripper of the robot arm 15.

The processing and control device 19 of the milking robot 14 is responsible for processing and controlling of various actions in the milking system, which inter alia includes the initiation of various activities in connection with the milking such as e.g. opening and closing of the gates 4 and 5, and control of the milking machine and its handling device 14. The processing and control device 19 comprises typically a microcomputer, suitable software, and a database including information about each of the cows milked by the milking machine, such as e.g. when the respective cow was milked last time, when the cow was fed last time, the milk production of the cow, the health of the cow, etc.

A cow approaching the milking system 3 is identified by a cow identification member, and the processing and control device 19 may then, depending on the identification, give the cow access to the milking system 3 by means of opening the inlet gate 4. When the cow 8 is located in the milking box, the teats thereof may be cleaned, after which the teat cups 11 are applied to the teats under control of the processing and control device 19. The cow 8 is typically capable of moving a short distance back and forth in the milking box, i.e. the exact position of the cow 8 in a longitudinal direction x is not typically known.

An arrangement for visual detection is therefore provided, which includes a first visual detection means, device, or camera 17 provided on the robot arm 15, and a second visual detection means, device, or camera 21 fixedly mounted (with respect to the milking box) and directed towards the cow 8 when being located in the milking box.

Typically, the processing and control device 19 is initially provided for controlling the movement of the robot arm 15 based on information of the position of the udder/teats of the cow relative the cow itself, and based on a position of the cow in the longitudinal direction x with respect to the cow 8 when being located in the milking box as detected by the fixedly mounted second visual detection device camera 21 in order to move the teat cup 11 to an approximate location of the teat of the cow, to which the teat cup is going to be applied. Thereafter the processing and control device 19 is provided for controlling the movement of the robot arm 15 based on a repeatedly determined position of the teat of the cow relative the robot arm as detected by the robot arm-mounted first visual detection device 17.

The information of the position of the udder/teats of the cow 8 relative the cow itself may have been obtained, e.g. measured, manually or automatically and is preferably stored in the processing and control device 19. For an older cow such information may only be needed to be established once, i.e. before the very first milking of the cow in the milking system. For younger cows or heifers the information may have to be established at regular intervals such as for instance once each month, or once each half year.

By the solution above no complicated analysis has to be made for the establishment of an approximate position of the udder/teats of the cow each time the cow is to be milked. The longitudinal position of the cow as detected by the second visual detection device 21 is the only parameter to be measured initially. In vicinity of the udder/teats of the cow 8 the first visual detection device 17 is used.

The first visual detection device 17 may be implemented in any manner known in the art, but comprises preferably a laser emitting laser light and a video camera provided to register laser light as reflected from the teats of the cow.

Figure 2:
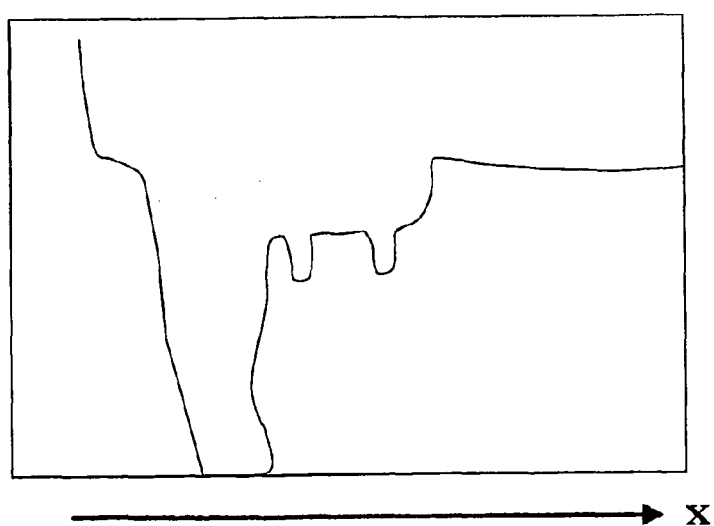
FIG. 2 is an example of an image detected by the arrangement of FIG. 1.

The second visual detection device 21 may be implemented in any manner known in the art, but is preferably a two-dimensional camera, and is located beside the cow when being in the milking box, and essentially on a level with the teats of the cow, and directed essentially in a direction y which is orthogonal to the longitudinal direction x of the cow. The two-dimensional camera records two-dimensional images repeatedly, and covers a larger detection area 23 than the first visual detection device 17. An example of such an overview image is shown in FIG. 2. The thick dashed line indicates the outer contour of the cow 8 as detected by image processing software in the two-dimensional camera, or in another device connected to the camera.

The image processing may include the common steps of pre-processing, segmentation, representation and description, and classification. Pre-processing is used to enhance the image by removing noise or distortions. Common techniques are smoothing, different edge detection techniques or logical operations for enhanced contrast and noise removal. Segmentation techniques are used to divide the image into objects, i.e. "interesting areas", and background. The objects are represented or described by descriptors, which e.g. could be size, grey levels, roundness, and are each given a unique identification number called a label. Classification is applied to the objects to associate the objects with objects which have been imaged by the two-dimensional camera.

The position of the cow in the longitudinal direction x when being located in the milking box may be established as a longitudinal position of the very back of the cow 8, or of any other part such as for instance a well-defined position of a hind leg of the cow 8.

Figure 3:
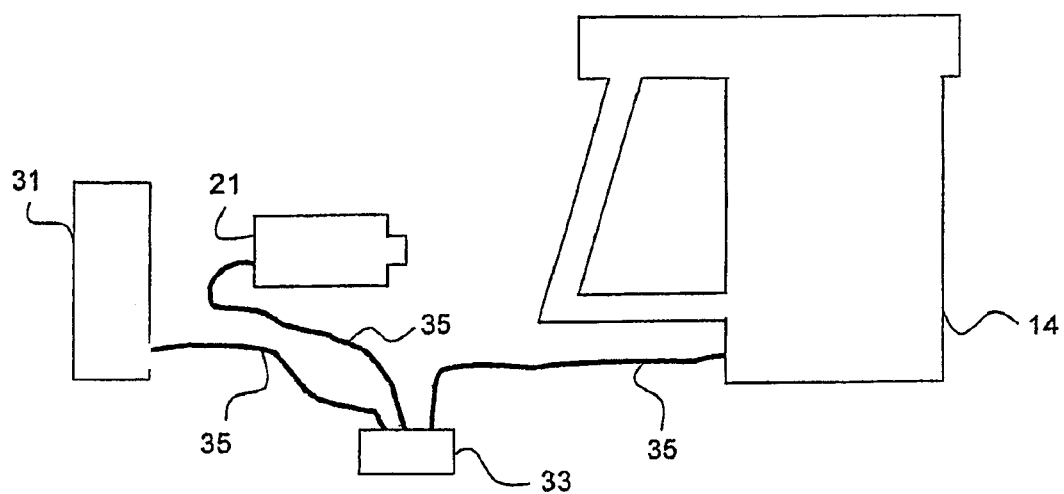
FIG. 3 is a schematic view of a network-based implementation of the arrangement of FIG. 1.

In FIG. 3 is shown a schematic of a flexible and simple network-based implementation of the second visual detection device. The device comprises a multipurpose two-dimensional network camera 21 and a server 31 provided with image processing software, wherein the server 31 is connected to the processing and control device 19 via a common network switch 33 and a standard wired or wireless connection 35, and is provided to communicate with the processing and control device 19 via a standard network protocol.

Such a network camera 21 has a lower detection frequency than the first visual detection device 17. The detection frequency of the network camera may be less than ten images/second, preferably less than five images/second, and most preferably less than two images/second. Typically, one image per second is quite sufficient in the present application.

It shall be appreciated that the network-based implementation as depicted above may be used for several other purposes. Such a multipurpose camera arrangement may be arranged for detecting some or all of the following:
  whether there exists a cow in the milking box or not,
  whether there exists an obstacle in the working area 25 (FIG. 1) of the robot arm or not,
  the activity of the cow when being located in the milking box,
  an incorrect teat cup attachment,
  a teat cup kick-off.

The above detections may be used for monitoring purposes, or for triggering different activities to be performed with respect to the cow.

In case the multipurpose camera arrangement is used for detecting whether there exists an obstacle in the working area of the robot arm or not an alarm device may be provided for alarming a user of the milking system, or a control device may be provided for halting the movement of the robot arm of the milking system, if an obstacle in the working area of the robot arm has been detected.

Still further, the above multipurpose camera arrangement may be used for recording a position of the teats with respect to the cow itself in connection with manual teaching of where to approximately find the teats of the cow. It may alternatively or additionally be used with the approaches for automatically teaching the milking system where to approximately find the teats of the cow.

It shall be appreciated by the person skilled in the art that the present invention may be implemented in other kinds of milking systems used for milking cows or any other animals having the capability to produce milk, wherein a robot arm is provided for automatically attaching teat cups to the teats of the milking animals.

The invention claimed is:

1. A milking system for automatically controlling movement of a robot arm used to attach a teat cup to a teat of a milking animal located in a milking box, the system comprising:
   a control device configured to control movement of the robot arm and to access a database storing teat position information associated with a plurality of milking animals;
   a first visual detection device on the robot arm, the first visual detection device configured to repeatedly determine a position of the teat of the milking animal relative to the robot arm; and
   a second visual detection device configured to be directed towards the milking animal located in the milking box and configured to detect a position of the milking animal in a longitudinal direction in the milking box,
   wherein
      the control device is configured to a colon retrieve, from the database, the teat position information associated with the milking animal in the milking stall, where the retrieved teat position information reflects the position of the teat of the milking animal relative to the milking animal itself,
      control initial movement of the robot arm based (1) on the teat position information retrieved by the control device and (2) on the position of the milking animal in the longitudinal direction detected by the second visual detection device, so as to position the robot arm to an approximate position of the teat of the milking animal, and
      after controlling the initial movement of the robot arm to the approximate position, control subsequent movement of the robot arm based on the position determined by the first visual detection device so as to reposition the robot arm until attachment of the teat cup to the teat of the milking animal.

2. The system of claim 1, further including:
   a server having image processing software for use with the second visual detection device in detecting the position of the milking animal in the longitudinal direction in the milking box,
   wherein the server is configured to communicate, over an electronic network, with the control device as part of controlling movement of the robot arm.

3. The system of claim 1, wherein the second visual detection device is configured to record a visual detection of the milking animal in connection with an earlier milking of the milking animal sufficient to deduce the teat position information for storage in the database accessed by the control device.

4. The system of claim 3, wherein the control device uses a determined teat position information from an earlier milking of the milking animal to automatically teach the approximate position determined by the control device in a subsequent milking of the milking animal.

5. The system of claim 1, wherein the second visual detection device is located beside the milking animal in the milking box, and is located approximately level with the teat of the milking animal, and is directed approximately orthogonal to the longitudinal direction of the milking animal.

6. The system of claim 1, wherein the second visual detection device is configured to detect if the milking animal exists in the milking box.

7. The system of claim 1, wherein the second visual detection device is configured to detect if an obstacle exists in a working area of the robot arm and wherein the second visual detection device further includes:
   an alarm for alarming a user of the milking system if the obstacle is detected in the working area of the robot arm.

8. The system of claim 1, wherein the second visual detection device is configured to:
   detect if an obstacle exists in a working area of the robot arm; and
   cause the control device to halt movement of the robot arm of the milking system if the obstacle is detected in the working area of the robot arm.

9. The system of claim 1, wherein said second visual detection device is configured to detect activity of the milking animal located in the milking box.

10. The system of claim 1, wherein the second visual detection device is configured to detect at least one of an incorrect teat cup attachment or a teat cup kick-off.

11. The system of claim 1, wherein the first visual detection device is configured to provide images at a first repetition rate and the second visual detection device is configured to provide images at a second repetition rate, the second repetition rate being lower than said first repetition rate.

12. The system of claim 11, wherein the second repetition rate is less than about ten images/second.

13. The system of claim 1, wherein the second visual detection device comprises a two-dimensional camera with a lens.

14. A method for automatically controlling movement of a robot arm used to attach a teat cup to a teat of a milking animal located in a milking box, the method comprising:
   accessing a database storing teat position information associated with a plurality of milking animals to retrieve, from the database, the teat position information associated with the milking animal in the milking stall, wherein the retrieved teat position information reflects the position of the teat of the milking animal relative to the milking animal itself;
   directing a first visual detection device, located on the robot arm, towards the milking animal located in the milking box;
   directing a second visual detection device towards the milking animal located in the milking box;
   detecting, with the second visual detection device, a position of the milking animal in a longitudinal direction in the milking box;
   controlling initial movement of the robot arm based (1) on the teat position information retrieved by the control device from the database and (2) on the position of the milking animal in the longitudinal direction detected by the second visual detection device, so as to position the robot arm at an approximate position of the teat of the milking animal;
   repeatedly determining, with the first visual detection device on the robot arm, a position of the teat of the milking animal relative to the robot arm; and
   after controlling the initial movement of the robot arm to the approximate position, controlling subsequent movement of the robot arm based on the position determined by the first visual detection device so as to reposition the robot arm until attachment of the teat cup to the teat of the milking animal.

15. The method of claim 14, further including:

recording, with the second visual detection device, a visual detection of the milking animal in connection with an earlier milking of the milking animal sufficient to deduce the teat position information for storage in the database accessed by the control device.

16. The method of claim 14, further including:

using a determined teat position information from an earlier milking of the milking animal to automatically teach the approximate position determined by the control device in a subsequent milking of the milking animal.

17. The method of claim 14, wherein directing the second visual detection device towards the milking animal located in the milking box, further includes directing the second visual detection device from a location beside the milking animal in the milking box and approximately level with the teat of the milking animal, and at a direction approximately orthogonal to the longitudinal direction of the milking animal.

18. The method of claim 14, further including:

detecting, with the second visual detection device, if the milking animal exists in the milking box.

19. The method of claim 14, further including:

detecting, with the second visual detection device, if an obstacle exists in a working area of the robot arm; and generating an alarm to a user of the milking system if the obstacle is detected in the working area of the robot arm.

20. The method of claim 14, further including:

detecting, with the second visual detection device, if an obstacle exists in a working area of the robot arm; and causing the control device to halt movement of the robot arm of the milking system if the obstacle is detected in the working area of the robot arm.

\* \* \* \* \*

UNITED STATES PATENT AND TRADEMARK OFFICE
CERTIFICATE OF CORRECTION

| | | |
|---|---|---|
| PATENT NO. | : 7,895,972 B2 | Page 1 of 1 |
| APPLICATION NO. | : 11/992399 | |
| DATED | : March 1, 2011 | |
| INVENTOR(S) | : Mats Gudmundsson et al. | |

It is certified that error appears in the above-identified patent and that said Letters Patent is hereby corrected as shown below:

On the Title page, item (73),
"Assignee: Delaval Holding AB, Tumba (SE)" should read
--Assignee: DeLaval Holding AB, Tumba (SE)--.

In the Claims, claim 1, col. 7, line 19,
"wherein
    the control device is configured to a colon retrieve, from" should read
--wherein the control device is configured to:
    retrieve, from--.

Signed and Sealed this
Tenth Day of May, 2011

David J. Kappos
*Director of the United States Patent and Trademark Office*